B. G. DUNHAM.
AUTOMATIC TELEPHONE SYSTEM.
APPLICATION FILED JULY 12, 1909.

1,103,572. Patented July 14, 1914.
9 SHEETS—SHEET 4.

B. G. DUNHAM.
AUTOMATIC TELEPHONE SYSTEM.
APPLICATION FILED JULY 12, 1909.

1,103,572.

Patented July 14, 1914.

B. G. DUNHAM.
AUTOMATIC TELEPHONE SYSTEM.
APPLICATION FILED JULY 12, 1909.

1,103,572.

Patented July 14, 1914.
9 SHEETS—SHEET 9.

UNITED STATES PATENT OFFICE.

BERT G. DUNHAM, OF URBANA, OHIO, ASSIGNOR, BY MESNE ASSIGNMENTS, TO WESTERN ELECTRIC COMPANY, OF NEW YORK, N. Y., A CORPORATION OF ILLINOIS.

AUTOMATIC TELEPHONE SYSTEM.

1,103,572.   Specification of Letters Patent.   Patented July 14, 1914.

Application filed July 12, 1909. Serial No. 507,195.

*To all whom it may concern:*

Be it known that I, BERT G. DUNHAM, a citizen of the United States, residing at Urbana, in the county of Champaign and State of Ohio, have invented certain new and useful Improvements in Automatic Telephone Systems, of which the following is a specification.

My invention relates to automatic telephone systems and particularly to those systems in which a plurality of finder switches less than the number of subscribers are used with means for connecting the finder switches through various other switches, such as first and second selector and connector switches, to establish talking circuits between different subscribers.

The object of my invention primarily is to so arrange the circuits and switches that the number of switches employed may be varied to suit the volume of business rather than the total number of subscribers. In systems, as usually employed, it is the practice to arrange a certain definite number of switches with trunking facilities based upon the total number of subscribers employed. But by my system I am enabled to arrange the subscribers in groups and to provide trunks extending from the different classes of switches, so that the number of switches in a group or the number of trunks employed may be varied according to the number of calls which would originate in the groups or in certain groups.

My invention consists in the various constructions, circuits and combinations of parts hereinafter more fully described and pointed out in the claims.

An outline of the system as devised by me is as follows: I preferably arrange the subscribers' lines or sub-stations in groups and these groups are connected in multiple to finder switches less in number than the total number of subscribers, generally about ten per cent. or five switches to fifty subscribers. The method of operating the finder switches is that employed in what is known as the Lattig & Goodrum system in which, by the operation of a line relay which occurs upon the closing of a subscriber's circuit by removing the telephone from the hook, the finder switches are automatically started and continue to operate until the switch finds the subscriber's line. This also automatically cuts through the subscriber's line from the finder switch to a selector switch or, in case of a large exchange, to what would be known as a first selector switch. At this point my system varies materially from the systems heretofore employed, in this, that it has been the custom heretofore in systems, such as described and in which flat or one-movement switches are used, to employ a second set of finder switches to find the trunk selected by the first selector and these second finder switches would be connected to a second selector or connector switch, as the case might be, while in my system I do away with the second finders and have the selector switches stepped up to a predetermined point to find a group of subscribers and then automatically find an idle trunk in that group, so that the selector switches partake of the nature of finder switches and selector switches having the capacity to be operated by impulses received from the subscribers' stations through the finder switches to select a certain group and to then automatically find an idle trunk in that group after the impulses have ceased.

There are other features of the invention which will more fully appear in the detailed descriptions, which are as follows:

In the drawings, Fig. 5ᵃ shows the ringing switch.

Figure 1:
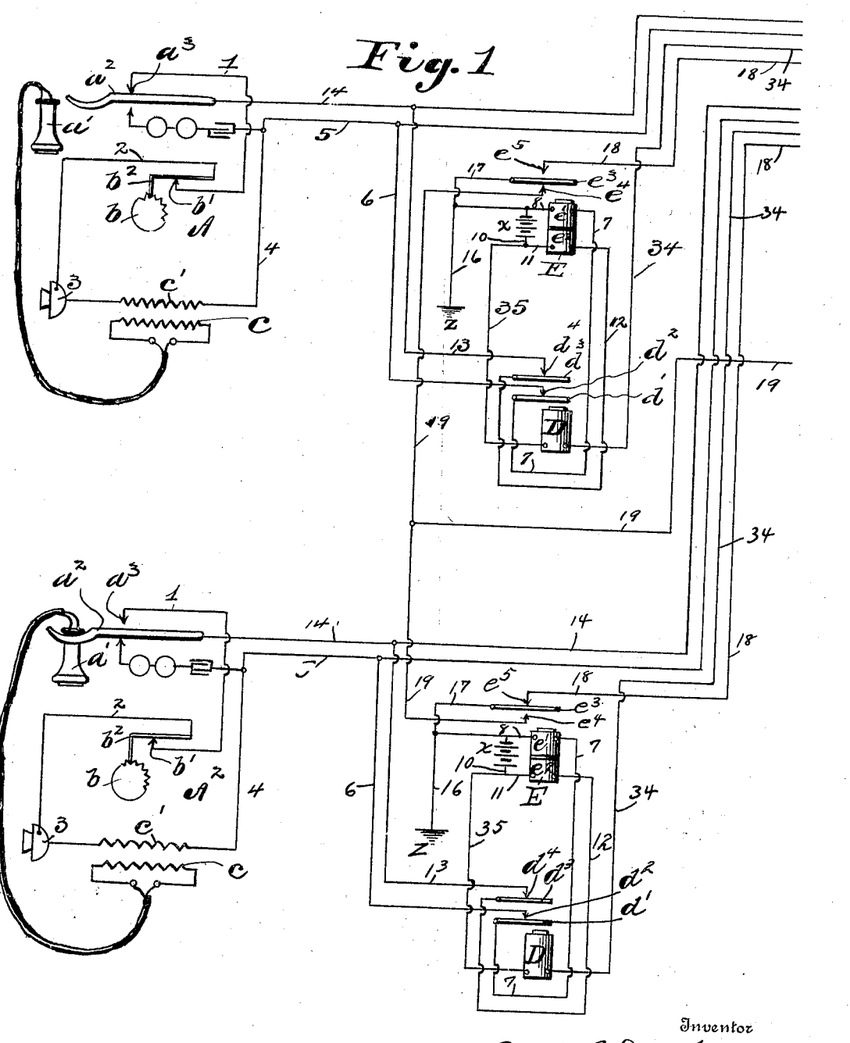
Figure 1 illustrates in diagram two subscribers' stations with the line and cut-off relays pertaining to these stations, these line and cut-off relays, it will be understood, will be ordinarily at the exchange while the subscribers' stations will be at any point removed therefrom.
Figure 2:
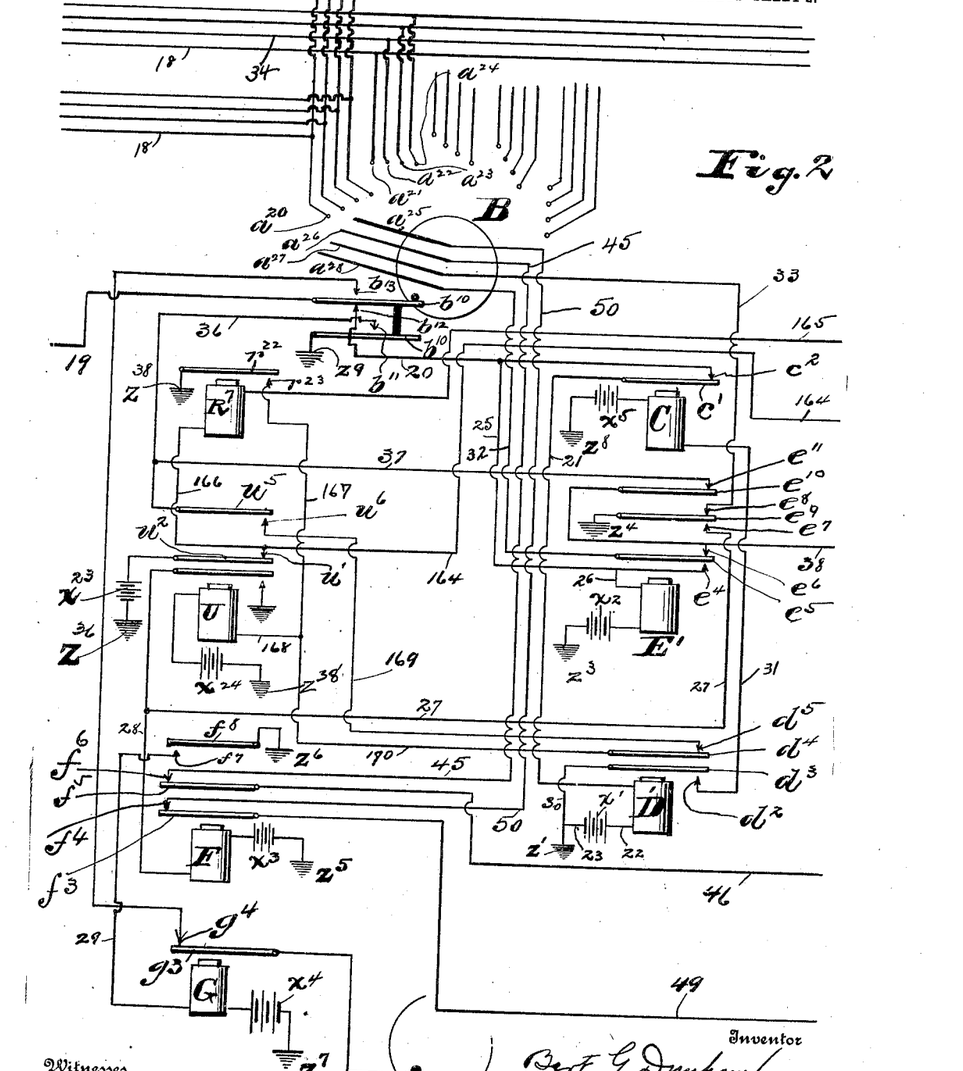
Fig. 2 shows a finder switch, the circuits from the subscribers' stations and from the line and cut-off relays being shown connected to this switch, it being understood that such circuits would be connected in multiple to all the switches assigned to this group of subscribers; that is, in the case of five switches to fifty lines, these subscribers' lines would be in multiple to five switches.
Figure 3:
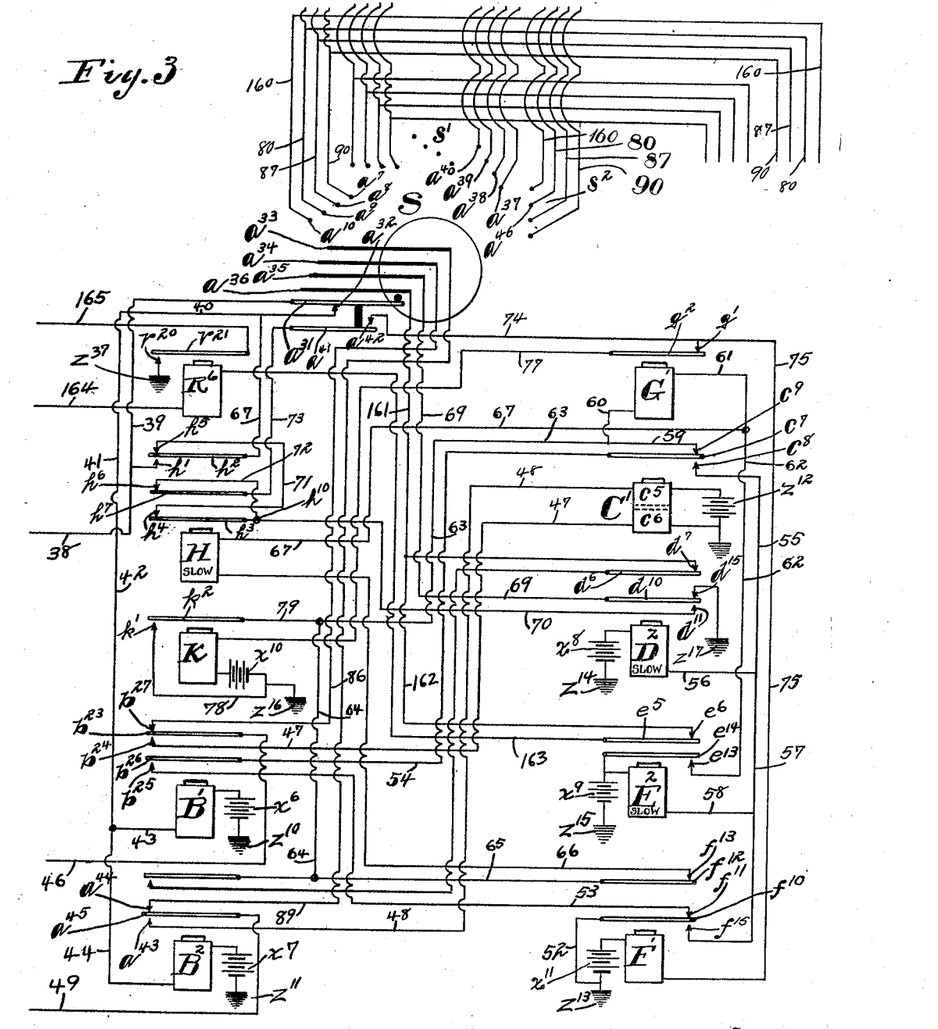
Fig. 3 shows what is generally known as a selector switch, but which, in this case, partakes of the nature of a selector and a finder switch, inasmuch as it selects the desired group of trunks leading to the subsequent switches and automatically finds an idle trunk in this group.
Figure 4:
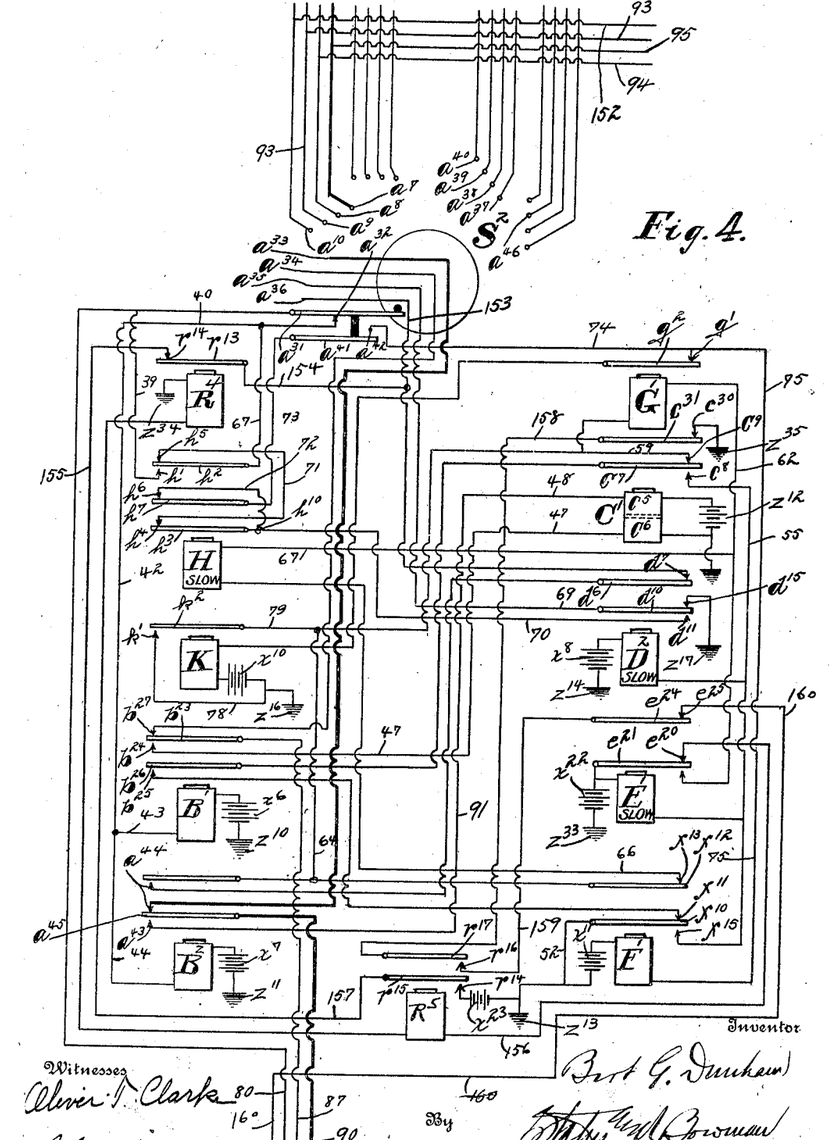
Fig. 4 is a second selector which may or may not be employed, which performs the same functions as the first selector, the constructions and arrangements being substantially the same except so far as they are modified to provide for the release of the switches.
Figure 7:
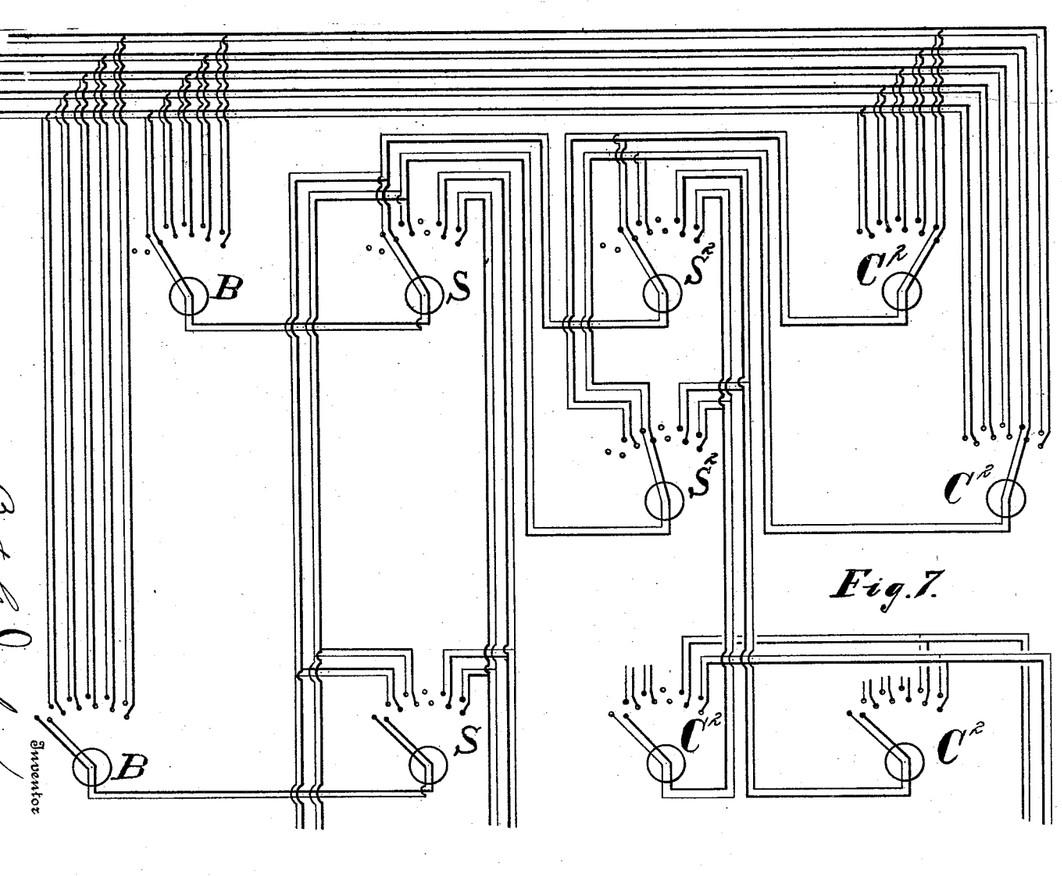
Fig. 7 is a diagrammatic view showing the arrangement of the trunking scheme between the various switches.
Figure 8:
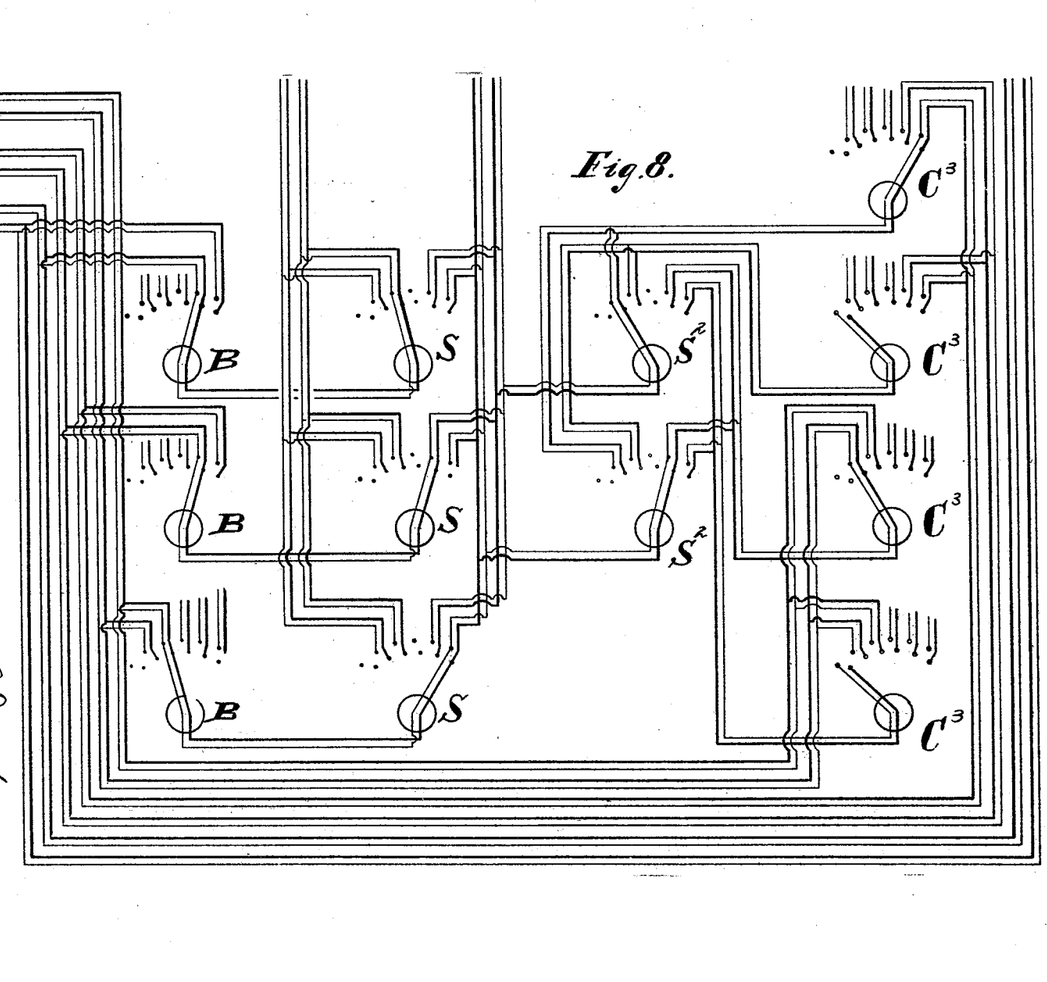
Fig. 8 is a diagrammatic view of the same showing the parts in different positions and connections.

The arrangement of the drawings is as follows: Sheet 1 and Fig. 1 is adapted to fit onto Fig. 2; that is to say, if Fig. 1 is placed at the right of Fig. 2 the connections between the parts in Fig. 1 and Fig. 2 will coincide. The same is true of Figs. 2 and 3. Fig. 3 connects with Fig. 4, but, in this case, the lines are not extended as the trunks from the first selector of Fig. 3 would go to a number of second selectors, shown in Fig. 4, but one set of trunks leading from the top of Fig. 3 would connect with a set of trunks coming up from the bottom of Fig. 4. Fig. 4 will join onto Fig. 5 and Fig. 5 will join onto Fig. 6. Figs. 7 and 8, being more general in their nature and relating to the general plan of the switches, are complete in themselves. The drawings on Sheet 9, and including Figs. 9 to 13, are different views showing the general style of switches used, the switches being all practically the same in their general construction and operation and differing in their association, in different cases, with different relays for adapting them to the positions they occupy in the systems and functions which they perform.

Figure 10:
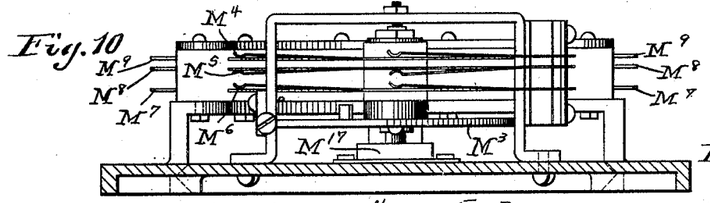
Fig. 10 is a sectional elevation of the same on the line $x$ $x$ in Fig. 9.
Figures 11, 12:
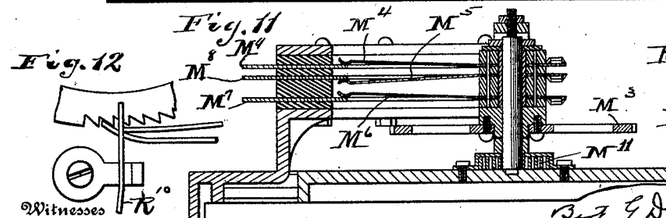
Fig. 11 is a sectional view on the line $y$ $y$ in Fig. 9 with the wipers moved over to the position shown in dotted lines in Fig. 9.
Figs. 12 and 13 are detail views of the release mechanism for the switch.

As stated above, the switches are arranged in groups, each group of finders being adapted to handle 50 lines and each group of selectors being adapted to handle as many groups of trunks leading to the other selectors or connectors as the volume of business demands. For illustrating purposes I have considered each selector as handling ten groups of four trunks each, each group of trunks being separated by a set of dead contacts. It will be understood that all of the switches have several banks of contacts, the finders and selectors having preferably four such banks of contacts, one above the other, the corresponding contacts in the banks, which handle the line and mate from the respective subscribers and the other two contacts handling the local circuits for operating the switches, being arranged in vertical lines. The switches are provided with an equal number of wipers to travel over these banks, which I preferably arrange one above the other on a vertical shaft, as shown in Figs. 10 and 11, which represent a connector switch and shows only three such banks and wipers. In Fig. 2, which shows the finder switch, I have shown five sets of contacts representing five different subscribers' lines and these five sets of contacts might be considered as representing one set of contacts out of each group of ten, making up the five groups of fifty contacts in the switch. It will be understood that there would be in a full-sized switch in this system, nine other sets of contacts in each group and these contacts would be multiplied to each of the five switches which constitute the group of finder switches assigned to fifty lines.

In Fig. 3, which represents the first selector, I have also shown five sets of contacts, the middle set being, as indicated, blank or dead; that is, they have no circuits connected to them. These sets of contacts, therefore, would represent two groups of trunks of two trunks each, it being understood that these groups might each contain any desired number of trunks, each group being separated, as above described, by a set of dead contacts. Each group of trunks from these contacts in Fig. 3, which represents the first selector, would lead to a group of second selectors to which they would be connected in multiple or to a group of connectors to which they would be connected in multiple, whether or not the second selectors are used depending upon the ultimate capacity of the exchange.

Fig. 4, which represents the second selectors, is, in this respect, substantially the same as Fig. 3; that is, it represents as connected to a switch two groups of connectors of two trunks each, the trunks in this case leading to a corresponding number of groups of connector switches. I have shown the lesser number of contacts associated with these different switches to avoid complication since, as before stated, each of the switches would normally have fifty sets of contacts divided into as many groups as desired to accommodate the traffic.

Figure 5:
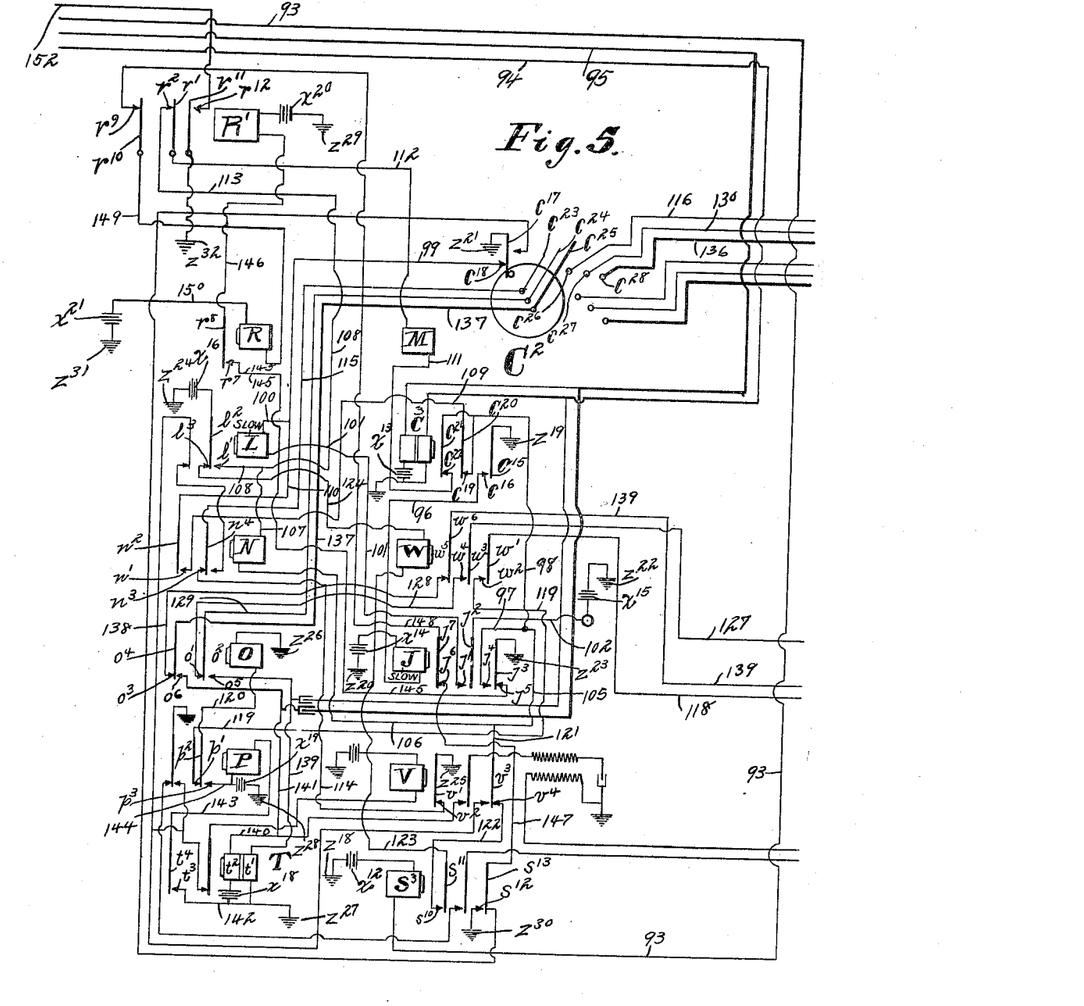
Fig. 5 shows a connector switch which could be connected to a second selector or a first selector.

Fig. 5, which represents the connector switch, shows only two sets of contacts which lead out to the subscribers and take up the outgoing calls. These two sets of contacts represent the contacts from two subscribers' lines out of a group of fifty, which this connector switch will serve, it being understood that these contacts would be multiplied to other connector switches, the number of connector switches so used being dependent upon the amount of traffic passing through the exchange of which this is a part.

Fig. 7 illustrates the arrangement of the multiple connections of the subscribers' lines to the finder switches and connector switches and the multiple connections of the trunks between the selector switches and from the selector to the connector switches. In this case two finder switches, both of the same group, are represented as being connected to different first selector switches. Each of these first selector switches being adapted to connect to either one of two groups of second selectors, only one group of second selectors of two each being shown. Then this group of second selectors of two switches is adapted to connect with two groups of connectors of two switches each.

Fig. 8 shows three finder switches representing three groups. These finder switches are connected to three first selector switches and these selector switches are connected in multiple, the bank contacts being arranged in groups of two trunks each, these trunks connecting in multiple to second selector switches arranged in groups. Two groups of trunks are shown for each first selector which trunks would normally lead to four different second selectors, two only, however, being shown. The second selectors also each show two groups of two trunks each, which trunks are connected in multiple to four connector switches. The bank contacts of these connector switches being so connected in multiple to the bank contacts of the finder switches.

With this primary description of the drawings it is thought that the circuits and the operation of the device would probably be best understood by describing the operation of the different parts necessary to connect a called subscriber with a calling subscriber.

Figures 5A, 6:
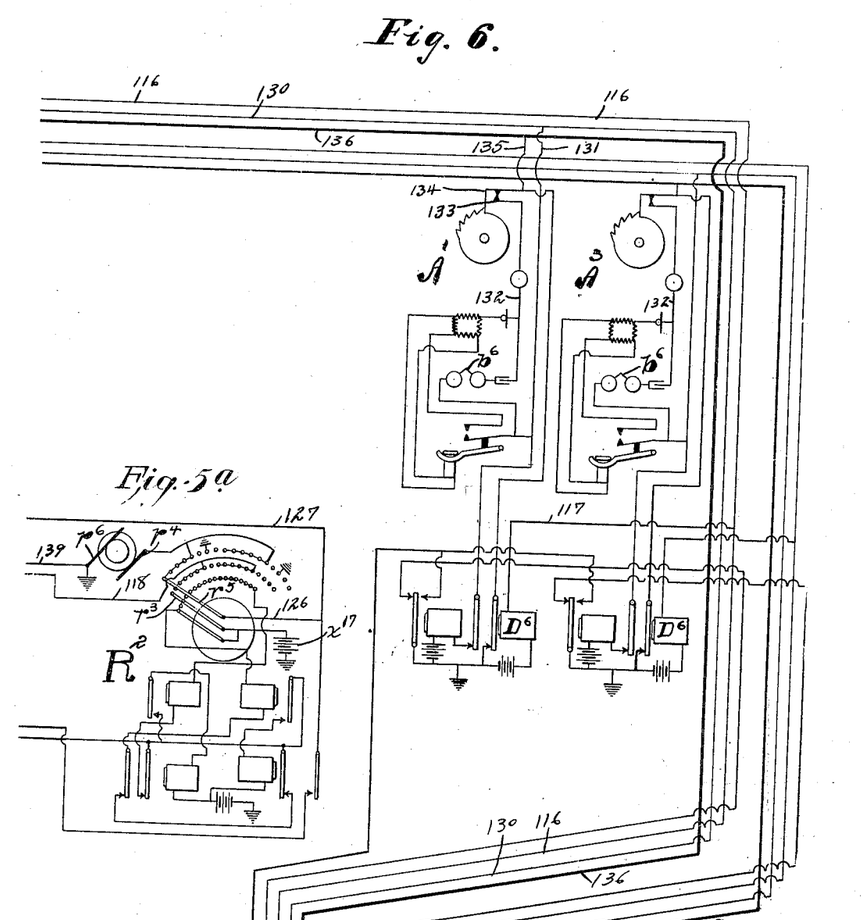
Fig. 6 represents two stations which, in the description hereinafter, will be known as called stations.

Starting with Fig. 1, I assume that station A is to connect with station $A^1$ in Fig. 6. Each subscriber's station would be provided with the usual talking and signaling instruments, $a^1$ representing the receiver, $a^2$ the switch hook, $a^3$ one of the contacts in the switch hook, $c$ and $c^1$ the windings of the induction coil, 3 the transmitter, $b$ an impulse transmitter, $b^1$ and $b^2$ springs and contacts for opening the circuit by the movement of the impulse transmitter. In originating a call, subscriber A removes his receiver, $a^1$, from hook, $a^2$, which allows said hook to close against the contact, $a^3$, and we get the following circuit: from contact $a^3$, by wire 1, contacts $b^1$ and $b^2$, wire 2, transmitter 3, winding $c^1$ of induction coil $c$, wires 4, 5 and 6, springs $d^1$ and $d^2$ of relay D, wire 7, coil $e^1$ of relay E, wire 8, battery $x$, wires 10 and 11, coil $e^2$, wire 12, springs $d^3$ and $d^4$ of relay D, lines 13 and 14, to hook $a^2$, at the subscriber's station, thus completing the battery circuit through relay E, which energizes the said relay E and causes spring, $e^3$, to make contact with $e^4$ and break contact with $e^5$.

When relay E is not energized we have a normally open circuit from ground $z$, through wires 16 and 17, springs $e^3$ and $e^5$, wire 18, to contact $a^{20}$, in Fig. 2. This is the ground connection that causes the finder switch to rotate past the terminal contacts of subscribers' lines whose receivers are in normal portions on the telephone hook. The energizing of the relay E closes the following circuit which starts the finder switch: starting with ground $z$, Fig. 1, through wires 16 and 17, spring $e^3$, contact $e^4$, wire 19, spring $b^{10}$, contact $b^{12}$, of the finder switch B (Fig. 2) wire 20, contact $c^2$, spring $c^1$, wire 21, through relay $D^1$, wire 22, to battery $x^1$, wire 23, to ground $z^1$, thus completing the circuit to energize the relay $D^1$. At the same time, relay $E^1$ is energized over a branch circuit from wire 20, to wires 25 and 26, through relay $E^1$, to battery $x^2$, to ground $z^3$, thus energizing relay $E^1$. The energizing of relay $E^1$ causes the armature spring $e^9$, to engage contact, $e^7$, which closes a circuit from ground $z^4$, through spring $e^9$, contact $e^7$, wires 27 and 28, to relay F and battery $x^3$, to ground $z^5$, thus energizing relay F. The purpose of relay F is, when energized, to hold the line wires 46 and 49 and the starter wire 19 open until the switch stops rotating. This latter is accomplished by energizing relay G by the operation of relay F which closes the circuit as follows: from ground $z^6$, spring $f^8$, contact $f^7$, wire 29, relay G, battery $x^4$, ground $z^7$. The energizing of relay G causes it to operate armature spring, $g^3$, and open contact, $g^4$, which connects with the starter wire to be extended to the next finder switch of the group. The finder switch is now ready to be stepped around. Relay $D^1$ being energized, armature, $d^3$, will contact with $d^2$ and thus close a circuit from ground $z^1$, through wire 30, spring $d^3$, contact $d^2$, wire 31, motor magnet C, battery $x^5$, to ground $z^8$. This energizes the motor magnet C and causes it to operate its armature preparatory to moving the wipers, $a^{25}$, $a^{26}$, $a^{27}$ and $a^{28}$, of the finder switch into engagement with the contacts, $a^{21}$, $a^{22}$, $a^{23}$ and $a^{24}$. As soon as the motor magnet, C, is energized, its armature spring, $c^1$, is withdrawn from contacts, $c^2$, thus opening the circuit that energizes relay $D^1$. The deënergizing of relay $D^1$ will open the circuit that energized the motor magnet C and the wipers, $a^{25}$, $a^{26}$, $a^{27}$ and $a^{28}$, will be moved forward one step. If the line relay of a subscriber's line, which is connected to this set of terminals, has not been operated, the contact or terminal, $a^{20}$, would be grounded and the wipers, being stepped up one step by the energizing of the motor magnet through the agency of the starter wire, as described, would cause the wiper, $a^{28}$, to find ground on the terminal, $a^{20}$, which would cause the relay, $E^1$, to get current from wiper, $a^{28}$, wire 32, spring $e^5$, contact $e^4$, wire 26, relay $E^1$, battery $x^2$, ground $z^3$. The relay $D^1$ will also be supplied with current from wiper $a^{28}$, wire 32, contact $e^5$, spring $e^4$, wire 25, contact $c^2$, spring $c^1$, wire 21, relay $D^1$, wire 22, battery $x^1$, wire 23, to ground $z^1$. This will cause the motor magnet, C, to again become energized which will in turn, deënergize relay $D^1$ and cause the switch to make another step, this operation being continued so long as the wiper, $a^{28}$, contacts with a grounded terminal over the following circuit, ground on wiper $a^{28}$, wire 32, contact springs $e^5$ and $e^4$, wire 26, through the relay $E^1$, battery $X^2$ and ground at $z^3$. The switch is now stepped up two steps and wiper, $a^{28}$, has engaged contact, $a^{21}$, from which the ground has been removed by the operation of the line relay E, and the relay $E^1$ becomes deënergized and the switch stops rotating as the deënergizing of this relay breaks the motor magnet circuit, so that it can no longer receive current. The switch having stopped rotating with the wiper, $a^{27}$, upon the contact, $a^{22}$, a circuit is closed through the cut-off relay D (Fig. 1) as follows: ground $z^4$, spring $e^9$, contact $e^8$, wire 33, wiper $a^{27}$, contact $a^{22}$, wire 34, relay D, wires 35 and 10, battery $x$, wire 16, and to ground $z$. This energizes the relay D (Fig. 1) and cuts out the line relay E from the subscriber's line, which is extended to the wipers, $a^{25}$ and $a^{26}$, with the line relay removed therefrom. The finder switch has now found the subscribers' lines which are extended by the relay F and are cut through to line wipers, $a^{33}$ and $a^{34}$, of the first selector switch S over the following circuit: wipers $a^{25}$ and $a^{26}$, wires 50 and 45, springs $f^4$ and $f^6$, armatures $f^3$ and $f^5$, wires 49 and 46, armatures $a^{45}$ and $b^{23}$, contacts $a^{44}$ and $b^{27}$, wires 89 and 86, to wipers $a^{33}$ and $a^{34}$. These wipers would now be ready to connect with the terminals of a trunk leading to a second selector or a connector, but, inasmuch as these wipers may have to pass over some contacts or terminals of lines which are in use or busy, provision is made for breaking the connection between the wipers of the finder switch and the wipers of the first selector, while the switch is being operated. This is accomplished as follows: The moving of the finder switch has shifted off-normal switch, $b^{10}$, to contact, $b^{11}$, thus closing a circuit from ground $z^9$, spring $b^{10}$, contact $b^{11}$, wires 36 and 37, contact $e^{11}$, spring $e^{10}$, wires 38 and 39, spring $a^{31}$, contact $a^{32}$, wires 40, 41, 42 and 43, relay $B^1$, battery $x^6$, to ground $z^{10}$. Wire 42 is also branched to wire 44, relay $B^2$, battery $x^7$, ground $z^{11}$. Relays $B^1$ and $B^2$ are thus both energized and, in operating their armature springs, break the line circuit to the wipers, as above described, and close the lines to the operating relay, $C^1$, over the following circuit: springs $b^{23}$ and $a^{45}$, contacts $b^{24}$ and $a^{43}$, wires 47 and 48, coils $c^6$ and $c^5$ of relay $C^1$, battery $z^{12}$, the line being closed at the subscriber's station and cut through to the springs $b^{23}$ and $a^{45}$, as before described, battery $z^{12}$ would be included in the circuit thus closed through the relay $C^1$ and energizing the said relay.

The energizing of relay $C^1$ causes it to close its armature spring $c^7$, against contact $c^8$, and break the contact at $c^9$. The closing of the spring, $c^7$, against the contact $c^8$, gives us the following circuit: from ground $z^{13}$, wire 52, spring $f^{10}$, contact $f^{11}$, wire 53, contact $b^{25}$, spring $b^{26}$, wire 54, spring $c^7$, contact $c^8$, wires 55 and 56, to relay $D^2$, battery $x^8$ and ground $z^{14}$; also through wire 58, to relay $E^2$, battery $x^9$ and ground $z^{15}$, so that both of the relays $D^2$ and $E^2$ are energized. The relays, $D^2$ and $E^2$, are both slow relays; that is, they are not deënergized readily, but will hold their magnetism for an appreciable amount of time, so that impulses of current through them will keep the armatures held up, while the relay, $C^1$, being a normal relay, will respond to any impulses of current and attract and repel its armature spring by impulses of current passing therethrough. The first selector switch, S, is now ready to receive impulses from the impulse transmitter, $b$, of the calling subscriber, which is arranged to break the closed circuit now existing on the subscriber's line through the first selector operating relay, $C^1$, and battery, $z^{12}$. Each time this circuit is broken the armature spring, $c^7$, of this operating relay $C^1$, is released which would break the circuit through the slow relays, $D^2$ and $E^2$, at contact $c^8$, but these relays being slow would maintain their magnetism and hold up their armatures for an appreciable time and until the relay, $C^1$, gets another impulse in the event that the impulses followed in ordinarily rapid succession. The contacting of the armature spring, $c^7$, of the operating relay, $C^1$, with back contact, $c^9$, closes a circuit through the motor magnet, $G^1$, of the selector switch. This motor magnet, $G^1$, is arranged, when energized, to draw up its armature against the tension of a spring and retract the operating pawl for the switch one notch, the mechanical construction being more particularly described hereinafter in connection with Fig. 9. As the motor magnet, $G^1$, is deënergized the spring retracts the armature and also pushes the pawl forward, thus moving the switch one notch or step. The circuit for energizing this motor magnet, $G^1$, may now be traced as follows: from ground $z^{13}$, wire 52, spring $f^{10}$, contact $f^{11}$, wire 53, contact $b^{25}$, spring $b^{26}$, wire 54, spring $c^7$, contact $c^9$, wires 59 and 60, motor magnet $G^1$, wires 61 and 62, contact $e^{13}$, spring $e^{14}$, battery $x^9$, to ground $z^{15}$. The immediate closing of the subscriber's line through relay $C^1$ would reënergize the relay $C^1$, and by attracting its armature, $c^7$, the circuit of the motor magnet $G^1$ would be opened which would become deënergized and thus give the switch its initial movement of one step forward. This first step of the selector switch, S, would allow the off-normal spring, $a^{31}$, to break the contact, $a^{32}$, through which current is being supplied to the holding relays $B^1$ and $B^2$, which, if allowed to be deënergized, would break the line circuit through the operating magnet $C^1$. To prevent this, relay H is provided which is energized at the same time that the motor magnet $G^1$ becomes energized by the closing of the armature spring, $c^7$, against contact $c^9$, over the following circuit: from ground $z^{13}$, wire 52, spring $f^{10}$, contact $f^{11}$, wire 53, contact $b^{25}$, spring $b^{26}$, wire 54, spring $c^7$, contact $c^9$, wire 59, wire 63, wire 64, wire 65, spring $f^{12}$, contact $f^{13}$, wire 66, relay H, wire 67, wire 62, contact $e^{13}$, spring $e^{14}$, battery $x^9$, to ground $z^{15}$. The relay H is a slow relay and will hold over during the impulses transmitted to motor magnet $G^1$ and will not respond to these impulses.

The energizing of the relay H will close a shunt around the open contact, $a^{32}$, from wire 38, contact $h^1$, spring $h^2$, wire 67 to wire 40, which allows the relays $B^1$ and $B^2$ to find ground over the switch wire 38, as before described.

Now, assume that the called subscriber with whom the calling subscriber A desires connection is in the second group of second selector switches. This would be in the set of contacts at the right of the dead contacts at $s^1$. Assuming, as shown in the drawings, that there are only two trunks in each group, it would be necessary for the calling subscriber to transmit four impulses over the line to step the first selector switch over the two trunks in the first group, the dead contacts, $s^1$, and into the first set of contacts belonging to the first trunk in the second group. The calling subscriber, therefore, turns his impulse transmitter four notches or steps, which transmits four impulses through the operating relay $C^1$, which, in turn, transmits four impulses through the motor magnet $G^1$, which steps up the wipers, $a^{33}$, $a^{34}$, $a^{35}$ and $a^{36}$, until they rest upon the contacts, $a^{37}$, $a^{38}$, $a^{39}$ and $a^{40}$, of the first trunk in the second group. The impulses now cease with the line closed at the subscriber's station. The operating magnet, $C^1$, is still energized, but the motor magnet, $G^1$, and the slow relay, H, are deënergized. In case the first trunk is busy, the contact, $a^{30}$, will be grounded in the manner hereinafter described, by the action of the first selector switch, which is using this trunk, and the wiper, $a^{35}$, therefore, will be grounded through this terminal and the selector switch, S, will continue to operate until it finds an idle trunk, in the following manner: The deënergizing of the slow relay, H, has broken the shunt from the switching wire 38, which was holding energized the relays $B^1$ and $B^2$, and means are therefore provided for reënergizing these relays over the following circuit: from ground at terminal $a^{30}$, wiper $a^{35}$, wire 69, spring $d^{10}$, contact $d^{11}$, wire 70, spring $h^3$, contact $h^4$, wire 71, contact $h^5$, spring $h^2$, wire 67, wires 41, 42, 43 and 44, through relays $B^1$ and $B^2$, batteries $x^6$ and $x^7$, to ground $z^{10}$ and $z^{11}$. The circuit thus traced divides on wire 70 at $h^{10}$ and passes through wire 72, contact $h^6$, spring $h^7$, wire 73, spring $a^{41}$, contact $a^{42}$, wire 74, contact $g^1$, spring $g^2$, wire 77, relay K, battery $x^{10}$, and ground $z^{16}$. This energizes the relay K, which may be termed the operating relay for the automatic stepper. The energizing of the relay, K, gives us the following circuit over the motor magnet $G^1$: ground $z^{16}$, wire 78, contact $k^1$, spring $k^2$, wire 79, wire 63, wire 60, motor magnet $G^1$, wires 61 and 62, contact $e^{13}$, spring $e^{14}$, battery $x^9$, and ground $z^{15}$. This energizes the motor magnet, $G^1$, and causes the switch operating pawl to move back one step preparatory to stepping the switch forward when the motor magnet, $G^1$, is deënergized. The circuit for the operating relay K, it will be noticed, passes through the contacts $g^1$, and motor magnet armature spring $g^2$, so that, as soon as the motor magnet is energized, it disconnects the operating relay K, which in turn deënergizes the motor magnet, $G^1$, and causes it to move the switch forward one step. This operation will continue so long as the wiper, $a^{35}$, would find a grounded contact in the set of trunk contacts leading to the second selector switches.

We will assume that the contacts, $s^2$, belong to an idle trunk and the wiper, $a^{35}$, does not find ground and hence the selector switch stops at this point. Inasmuch as the relays $B^1$ and $B^2$ are held up through the ground on the wiper, $a^{35}$, these relays will be deënergized when the wipers have reached an idle trunk, the deënergizing of the relays $B^1$ and $B^2$ will open the line wires through relay $C^1$ and switch them onto the wipers, $a^{33}$ and $a^{34}$, as before described. The deënergizing of relay $C^1$ will cause the slow relays $D^2$ and $E^2$ to become deënergized and their armature springs will drop back to normal position. The operating magnet, K, having received its current through the ground connection of the wiper, $a^{34}$, will be opened and deënergized, which will in turn deënergize the motor magnet $G^1$.

The number of trunks and contacts in each group are generally arranged in multiples of 5 or, if more trunks are needed, in multiples of 10, in the first case then the movement of the dial to come into the different groups would be 5, 10, 15, etc., and in the other case it would be 10, 20, 30, etc. Any desired arrangement can be made, however, and an arbitrary arrangement of numbers in calling may be used.

To provide against the possibility of the selector switch stopping on a busy trunk, in case the calling subscriber should hang up while the switch was automatically stepping over busy trunks, which might occur by reason of the deënergizing of the operating relay, $C^1$, which in turn would release the slow relays, $D^2$ and $E^2$, I provide additional means for holding the relays, $D^2$ and $E^2$, energized so long as the switch wiper, $a^{35}$, is passing over grounded or busy contacts, and this is accomplished by branching the circuit which energizes the magnet K from the contact $g^1$, wire 75, relay $F^1$, battery $x^{11}$, ground $z^{13}$. This causes the armature spring $f^{10}$, to engage with contact, $f^{15}$, and closes the circuit through wires 57, 56 and 58, through the slow relays $D^2$ and $E^2$, batteries $x^8$ and $x^9$, to ground $z^{14}$ and $z^{15}$, so that even though the calling subscriber should hang up and thus open his line, the switch would continue to step over the busy trunks until an idle trunk or ungrounded terminal was found. This relay, $F^1$, is dependent for its battery supply by reason of its connection to the wiper, $a^{35}$, and, in the event that the wiper stops on an ungrounded connection, this relay, $F^1$, will also be deënergized and will drop back to normal position. The lines are now cut through to the second selector switch of the second group. The deënergizing of the relay $D^2$ permits its armature spring, $d^{10}$, to contact with the back contact, $d^{15}$, which closes a grounded connection from ground $z^{17}$, contact $d^{15}$, spring $d^{10}$, wire 69, wiper $a^{35}$, thus putting ground on $a^{46}$ of the set of contacts, $s^2$, thus rendering this trunk busy to all other selector switches. The terminal, $a^{46}$, is connected by wire 80 to the off-normal spring, $a^{31}$, of the second selector, $S^2$, and inasmuch as the operation of the second selector, so far as the stepping around and finding a trunk is concerned, is identical with the first selector, $S^1$, the parts are lettered the same and the operation will be the same, the only difference being in the operation of the release which will be more fully described hereinafter in connection with the releasing of all the switches.

Assuming that the party desired is in the first group of connector switches and that the first trunk is idle, the second selector, $S^2$, will be stepped up one step and its wiper, $a^{35}$, not finding ground, the wiper will stop on this set of terminals which will cut the lines through to the connector switch and deënergize all of the relays in the manner described for the first selectors, and to the ground on wiper $a^{35}$, which will, in turn, ground wire 93, which is connected to the switching relay, $S^3$, of the connector switch (Fig. 5) to battery and ground $z^{18}$. The subscriber's line wires have thus been cut through from the second selector switch to wires 94 and 95 which are connected directly through the operating relay $C^3$, battery $x^{13}$, thus energizing the said relay by reason of the fact that the lines are closed at the calling subscriber's station. The action of the relay, $C^3$, energizes the relay, J, as follows: ground $z^{19}$, spring $c^{15}$, contact $c^{16}$, wire 96, relay J, battery $x^{14}$, ground $z^{20}$, thus energizing relay J. When the impulse wheel, $b$, (Fig. 1) is operated, relay, $C^3$, will respond and open and close its contacts, but as relay J is a slow relay it will remain in energized condition and a circuit will be established to operate relay L after the off-normal spring, $c^{17}$, breaks contact. It is to be noticed, however, that relay L is energized as soon as relay J operates its springs, as follows: ground $z^{21}$, spring $c^{17}$, contact $c^{18}$, wires 99 and 100, relay L, wire 101, contact $j^1$, spring $j^2$, wire 102, battery $x^{15}$, to ground $z^{22}$, thus energizing relay L. Relay N will now be energized by the action of relay J, as follows: ground $z^{23}$, spring $j^3$, contact $j^4$, wires 97, 105 and 106, relay N, wires 107 and 108, contact $l^1$, spring $l^2$, battery $x^{16}$, to ground $z^{24}$, thus energizing relay N. After the switch has taken one step the contact between the off-normal spring, $c^{17}$, and contact, $c^{18}$, would be broken and relay L would be deënergized, but relay L is a slow relay and will receive impulses from operating relay $C^3$, as follows: ground $z^{23}$, spring $j^3$, contact $j^4$, wires 97 and 98, contact $c^{19}$, spring $c^{20}$, wires 109, contact $n^1$, spring $n^2$, wire 110 and 100, relay L, wire 101, contact $j^1$, spring $j^2$, wire 102, battery $x^{15}$, to ground $z^{22}$. As relay L is a slow relay it will remain in energized condition during the time that relay $C^3$ is receiving impulses. At the same time the motor magnet M is operated, as follows: ground $z^{23}$, spring $j^3$, contact $j^4$, wires 97 and 98, spring $c^{21}$, contact $c^{22}$, wire 111, motor magnet M, wire 112, spring $r^1$, contact $r^2$, wires 113 and 108, contact $l^1$, spring $l^2$, battery $x^{16}$, to ground $z^{24}$, thus completing the circuit to energize motor magnet M. As soon as relay $C^3$ stops receiving impulses, relays L and N will become deënergized and the circuit through which motor magnet M was energized will be broken so that the switch cannot again be stepped around until after it has been restored to normal position.

I will now suppose that wipers, $c^{23}$, $c^{24}$ and $c^{25}$, have been moved into contact with contacts, $c^{26}$, $c^{27}$ and $c^{28}$ and I have a circuit from ground $z^{25}$, spring $v^1$, contact $v^2$, wire 114, contact $n^3$, spring $n^4$, wire 115, wiper $c^{23}$, contact $c^{26}$, wires 116 and 117, to relay $D^6$ and battery relay $D^6$ is the cut-off relay for the called station $A^1$. This operates the called subscriber's cut-off relay $D^6$, which will thus cut off his line relay to prevent its being operated by the closing of his line, so that the removing of his telephone will not start the finder switch; also a connection is established from ground $z^{25}$ to terminal contact $c^{26}$ and to multiples thereof so that if a connector switch should stop on a multiple of this contact it would receive a busy test. The application of the busy test depends upon the operation of relay V.
Relay V is energized over a circuit which can be traced from wiper $c^{23}$ and wire 115 to contact $n^4$ on relay N, and thence by way of a front contact on relay N, back contact on relay L and relay T to relay V, battery and ground. This circuit is completed upon the deënergization of relay L and before relay N, which would open this circuit, is deënergized. The relay V, however, would be held up after the opening of said circuit at relay N by a locking circuit over a part of the circuit last described, and passing through $v^3$ on relay V, wires 105 and 97, and contacts $j^4$ and $j^3$ to ground at $z^{23}$, so that the busy tone would be applied until the switch is released and said holding circuit is broken at contact $j^3$ when relay J is deënergized. It should likewise be noted that relay W is energized as soon as relay L is deënergized by means of a circuit traceable from ground $z^{23}$, spring $j^3$, contact $j^4$, wires 97, 105 and 121, spring $v^3$, contact $v^4$, wire 122, contact $s^{10}$, spring $s^{11}$, wire 123, relay W, wire 124, contact $l^3$, spring $l^2$, battery $x^{16}$, ground $z^{24}$. This station is ready to be rung and this is accomplished by intermittent ringing current and intermittent battery supplied and controlled by a ringing switch, $R^2$, (Fig. 5$^a$). This intermittent battery operates relay O, (Fig. 5) as follows: battery $x^{17}$, wiper $r^3$, through the bank contacts to wire 118, spring $w^1$, contact $w^2$, wire 119, contact $p^1$, spring $p^2$, wire 120 relay O, to ground $z^{26}$, thus energizing relay O.

Generator current is furnished to the called line as follows: brush $r^4$ (Fig. 5$^a$), to the contacts of the ringing switch bank wiper $r^5$, wires 126 and 127, spring $w^3$, contact $w^4$, wire 128, contact $o^1$, spring $o^2$, relay O being deënergized, wire 129, wiper $c^{24}$, contact $c^{27}$, wires 130 and 131, to one side of the bells $b^6$, through the bells and condenser to wire 132, contact 133, spring 134, wires 135 and 136, contact $c^{28}$, wiper $c^{25}$, wire 137, spring $o^4$, contact $o^3$, wire 138, contact $w^5$, spring $w^6$, wire 139, brush $r^6$, thus completing the circuit through the bells and generator.

When the receiver is removed from the hook at the called station, $A^1$, relay T will be energized as follows: from grounded or positive side of battery $x^{18}$, to coil $t^1$, of relay T, wire 139, contact $o^5$, and when relay O is energized, as above explained, the line will be extended to spring $o^2$, wire 129, and so on to the called station, as described in the ringing circuit. The opposite or negative side of the battery, $x^{18}$, passes through coil $t^2$, of relay T, to wires 140 and 141, to contact $o^6$, and when relay O is energized the line is extended to spring $o^4$, wires 137, and so on, as above described, for the ringing circuit to the called station. Thus it can be seen that when the line is closed at the called station, relay T will be energized and relay O, having been energized by the battery from the ringing switch, will remain energized as long as relay T is energized, as follows: When relay T is energized it closes a circuit through relay P which can be traced from ground $z^{27}$ through wire 142, contact $t^3$, spring $t^4$, wire 143, relay P, battery $x^{19}$ to ground $z^{28}$. Thus relay T will operate and close a circuit which in turn will lock the operative relay O as long as relay P is energized. This circuit extends from battery $x^{19}$ by way of wire 144, contact $p^3$, spring $p^2$, wire 120, relay O to ground $z^{26}$. Thus the subscriber's talking circuit will be closed at the make contacts of relay O and this relay will hold the circuit closed until relay T is deënergized by the opening of the called subscriber's loop at the called subscriber's telephone set, due to the hanging up of the receiver.

Condensers are interposed between the lines of the calling station and the called station, thus completing the talking circuit between the two stations. It must now be shown how the release of the switches is accomplished: I will start with the connector switch (Fig. 5) and trace the release back to the finder switch (Fig. 2). When the calling party hangs up his receiver relay $C^3$ will become deënergized and close the following circuits to energize release relay R and $R^1$: the deënergizing of relay $C^3$ opens the circuit for relay J permitting its armature springs $j$ and $j^7$ to engage back contacts $j^5$ and $j^6$, this closes the circuit for release relay R from ground at $z^{30}$, contact $s^{12}$, spring $s^{13}$, wire 147, contact $j^6$, spring $j^7$, wire 148, back contact $r^9$, spring $r^{10}$, wire 149, release magnet R, wire 150, battery $x^{21}$ to ground $z^{31}$, also as soon as release magnet R is energized the circuit for relay $R^1$ is as follows: ground $z^{23}$, spring $j^3$, contact $j^5$, wire 145, contact $r^7$, spring $r^8$, wire 146, relay $R^1$, battery $x^{20}$ to ground $z^{29}$, thus relay $R^1$ can not be energized until after the release magnet is energized and as soon as release relay $R^1$ is energized the release magnet R is deënergized by breaking its circuit at contact $r^9$. The energizing and deënergizing of the release magnet R causes it to release the switch in the manner well understood with the type of switch illustrated in the drawings and hereinafter very briefly described. At the same time that relay $R^1$ was energized the following circuit was completed to release the second selector: ground $z^{32}$, spring $r^{11}$, contact $r^{12}$, wire 152, contact $a^{10}$, wiper $a^{36}$, wires 153 and 154, spring $r^{13}$, contact $r^{14}$, wire 155, relay $R^5$, wire 156, contact $e^{20}$, spring $e^{21}$, battery $x^{22}$, ground $z^{33}$, thus energizing relay $R^5$, which will establish the following circuit through the release magnet $R^4$: grounded battery $x^{23}$, contact $r^{14}$, spring $r^{15}$, wire 157, release magnet $R^4$, to ground $z^{34}$, thus energizing release magnet $R^4$, which will open the circuit just traced for relay $R^5$ at spring $r^{13}$, and allow the second selector switch mechanism to be released. At the time the relay $R^5$ was energized, the following circuit was also established to release the first selector and finder switches: ground $z^{35}$, contact $c^{30}$, spring $c^{31}$, wire 158, spring $r^{17}$, contact $r^{16}$, wire 159, spring $e^{24}$, contact $e^{25}$, wire 160, contact $a^{40}$, wiper $a^{36}$, wire 161, wire 162, contact $c^6$, spring $e^5$, wire 163, release magnet $R^6$, wire 164, contact $u^1$, spring $u^2$, battery $x^{23}$, to ground $z^{36}$, thus energizing the first selector release magnet $R^6$, which closes the following circuit: ground $z^{37}$, contact $r^{20}$, spring $r^{21}$, wire 165, finder release magnet $R^7$, wire 166, contact $u^1$, spring $w^2$, battery $x^{23}$, to ground $z^{36}$, thus energizing release magnet $R^7$, which establishes the following circuit to energize locking relay U: ground $z^{38}$, spring $r^{22}$, contact $r^{23}$, wires 167 and 168, locking relay U, to battery $x^{24}$, to ground $z^{38}$, thus energizing relay U and opening the battery circuit for release magnets $R^7$ and $R^6$ at contact $u^1$. Relay U will remain locked up until the finder switch returns to its normal position, as follows: ground $z^9$, spring $b^{10}$, contact $b^{11}$, wire 36, spring $u^5$, contact $u^6$, wire 169, contact $d^5$, spring $d^4$, wires 170 and 168, relay U, battery $x^{24}$, to ground $z^{38}$, thus closing its own energizing circuit until broken by the off-normal spring $b^{10}$.

It will thus be seen that means are provided by which calls may be automatically interchanged between any desired number of subscribers by a number of switches which will be governed almost entirely by the amount of traffic. The use of the intermediate finder switches in connection with the selector switches, which has heretofore been the practice when the flat or one movement switches are employed, is entirely dispensed with, the selector switches being adapted, when a group is found, to automatically select an idle trunk in the group.

In the selector switch I have shown two relays, $B^1$ and $B^2$, for operating the four spring contacts in connection with the circuits described. It is obvious that one relay might be used to perform this function by supplying its armature with the four contacting devices. This same is true of the relays $D^2$ and $E^2$, which are connected in multiple to wire 57 and through battery to ground. I have shown the two relays in each case, for this purpose, as connections are more simple than where four switching contacts are supplied to one relay.

The dead contacts are to prevent the switch from stepping past a group in case all the trunks in the group are busy. In such case the switch would stop when it reached the dead contact. Means (not shown) would also be provided for automatically releasing the switch in this event.

Figure 9:
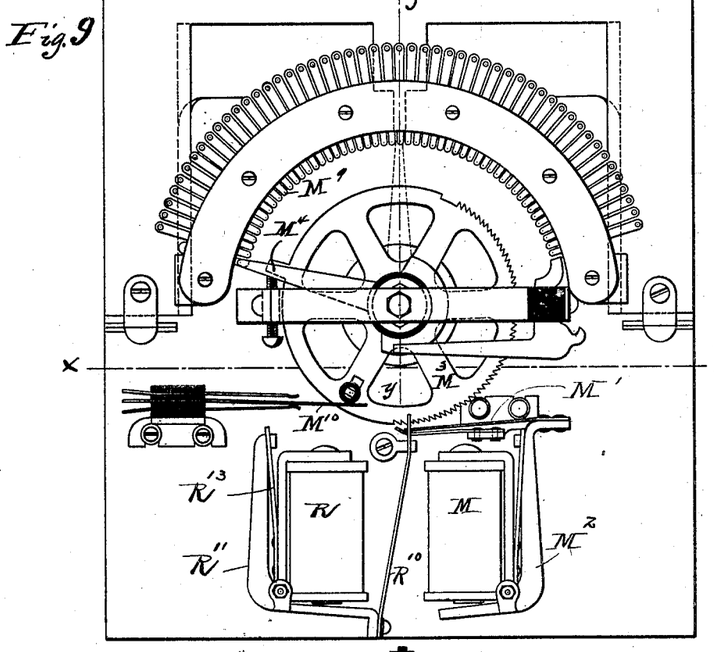
Fig. 9 is a plan view of the switch which I preferably employ in connection with these circuits.
Figure 13:
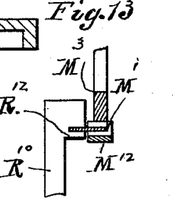

The switches which are employed are not materially different from those employed by Lattig and Goodrum and as set forth in previous applications filed by myself. Fig. 9 shows a plan view of the switch, M being the motor magnet and R the release magnet, $M^1$ is the operating pawl attached to the armature $M^2$ of the motor magnet. An arm, $R^{10}$, attached to the armature $R^{11}$ of the release magnet and having an off-set portion $R^{12}$ at the top, as shown in Fig. 13, to engage the operating pawl when the magnet is energized and thus draw the operating pawl and the holding pawl $M^{12}$ out of contact with the ratcheted wheel $M^3$ by means of the spring $R^{13}$, when the release magnet is deenergized. The wipers which are operated by the ratcheted wheel $M^3$ are shown at $M^4$, $M^5$ and $M^6$ to engage with the bank contacts arranged in horizontal rows, as shown at $M^7$, $M^8$ and $M^9$ in Fig. 11. Off-normal spring for operating the off-normal contacts when the switch is started is shown at $M^{10}$, and coil spring $M^{11}$ arranged in a spring case attached to the shaft is adapted to return the wipers to normal position when released.

It is quite obvious that the particular form of the switches used forms no part of the invention and that same might be used with switches of various kinds and that the constructions and arrangements might be variously changed and not affect the spirit of the invention.

Having thus described my invention, I claim:

1. In an automatic telephone exchange, a series of finder switches, and means for operating said switches to find a subscriber's line by closing the subscriber's circuit, selector switches connected to said finder switches, means for operating said selector switches in response to interruptions in the current passing over the subscriber's line to cause said selector switch to step any desired distance, trunks having terminal contacts in said selector switches arranged in groups, said trunks being connected in multiple to other selector switches and means for continuing the operation of a switch after the impulses from the subscriber's station have ceased to cause it to automatically find an idle trunk in the group selected.

2. The combination with a selector switch having bank terminal contacts arranged in groups in the same horizontal plane, wipers for traversing said contacts, and an operating relay connected with said switch adapted to be connected to a subscriber's line and respond to impulses from a subscriber's station, a motor magnet controlled by said operating relay to cause said switch to advance one step for each impulse in said operating relay, and a second operating relay adapted to receive operative energy through a circuit in which a wiper on said switch constitutes a part, said second operating relay being adapted to control said motor magnet and operate the same when the wiper on said switch completes the circuit to said second operative relay, and means for completing the circuit through said wiper when a trunk associated with the terminal with which said wiper is engaged is in use in another switch, as and for the purpose set forth.

3. In an automatic telephone system, selector switches, terminal contacts arranged in horizontal rows, means for operating said switches by impulses from the subscriber's station to cause the wipers of a switch to traverse said terminal contacts, and means for supplying current to the operating mechanism of a switch through one of said contacts to cause it to continue its operation to find an idle trunk or connection, and means for holding the operating mechanism of said switch from being released by the opening of the subscriber's line during the automatic stepping of said switch, as and for the purpose set forth.

4. In an automatic telephone system, a series of subscribers' lines, finder switches less than the number of lines arranged in groups and connected in multiple to said lines, a plurality of selector switches less than the number of lines and connected to said finder switches, connector switches arranged in groups connected in multiple to trunks terminating in contacts arranged in groups in the selector switches, said contacts in different switches being arranged in single banks but the groups separated by abnormal contacts, means in said selector switches for responding to impulses from the subscriber's station when connected thereto by the finder switches, said impulses thereby being adapted to cause said selector switches to move one step for each impulse to select the terminals of trunks in different groups, and means for automatically continuing the operation of said switch after said impulses cease to cause it to find an idle trunk in the said group and to connect the subscribers' wires to the said idle trunk and thus to a connector switch, said abnormal contacts being arranged to automatically stop said switch and prevent its further movement in case all the trunks of the group are busy, as and for the purpose set forth.

5. In an automatic telephone exchange a selector switch and other switches with which the subscribers' lines are to be connected, a line relay, means for connecting said line relay into subscribers' lines when the said subscribers' lines are extended to said selector switch, a motor magnet adapted to produce a step-by-step movement of said switch, and mechanism for operating said motor magnet in response to impulses in said line relay, trunk connections arranged in groups to said other switches, said trunk connections ending in terminals arranged in groups in banks of said selector switch, an operating relay independent of said line relay adapted to be operated by current supply through a circuit of which one of the terminals of said trunk is a part, means connected with said operating relay for causing the motor magnet to respond to impulses in said operating relay independent of said line relay, means for deënergizing said operating relay and thus stopping said switch when the wiper reaches an idle trunk, and electrical means also operated through said wiper to disconnect the line relay and to switch the subscribers' lines onto the wipers of the switch for connection to the idle trunk thus found.

6. In an automatic exchange having a selector switch, a line relay, means for connecting said line relay onto subscribers' lines, a motor magnet adapted to produce a step-by-step movement of said switch in response to impulses to said line relay, an operating relay independent of said line relay normally connected to a wiper in said switch and adapted to be operated by current supplied through a circuit of which one of the bank terminals of the switch is a part, and a slow relay adapted to receive impulses simultaneously with the impulses of the motor magnet to open the circuit of the operating relay while said motor magnet is being operated from said line relay, said operating relay being adapted when energized to operate said motor magnet.

7. In a telephone system, a selector switch, a line relay, a switching relay for switching the subscriber's line through said line relay and a circuit including a motor magnet by which impulses in the line relay are repeated into said motor magnet, a slow relay also energized by the operation of said line relay to close the circuit of the motor magnet, an operating relay independent of said line relay adapted under certain conditions to receive current through a circuit formed in part by the wiper of said switch and when energized to operate said motor magnet, a second slow relay energized by the opposite movement of the line relay armature from that which energizes the first slow relay, said second slow relay being adapted to open the circuit from the wiper to said operating relay when energized by impulses repeated thereto from the line relay and to become deënergized when the current is flowing uninterruptedly through said line relay.

In testimony whereof, I have hereunto set my hand this 18th day of May 1909.

BERT G. DUNHAM.

Witnesses:
CHAS. I. WELCH,
MARJORIE S. MORROW.

Copies of this patent may be obtained for five cents each, by addressing the "Commissioner of Patents, Washington, D. C."